United States Patent [19]

Allison

[11] Patent Number: 5,212,796
[45] Date of Patent: May 18, 1993

[54] SYSTEM WITH MODULES USING PRIORITY NUMBERS RELATED TO INTERRUPT VECTORS FOR BIT-SERIAL-ARBITRATION ON INDEPENDENT ARBITRATION BUS WHILE CPU EXECUTING INSTRUCTIONS

[75] Inventor: Nigel J. Allison, Austin, Tex.

[73] Assignee: Motorola, Inc., Schaumburg, Ill.

[21] Appl. No.: 866,943

[22] Filed: Apr. 6, 1992

Related U.S. Application Data

[63] Continuation of Ser. No. 459,507, Jan. 2, 1990, abandoned.

[51] Int. Cl.$^5$ .............................................. G06F 13/14
[52] U.S. Cl. ............................... 395/725; 364/230.2; 364/241; 364/241.2; 364/241.5; 364/242.6; 364/242.8; 364/242.9; 364/DIG. 1; 364/935.4; 364/935.41; 364/940.1; 364/941.3
[58] Field of Search ............... 395/275, 725; 370/85.2, 370/85.6; 340/825.5, 825.52

[56] References Cited

U.S. PATENT DOCUMENTS

| | | | |
|---|---|---|---|
| 4,268,904 | 5/1981 | Suzuki et al. | 364/200 |
| 4,320,467 | 3/1982 | Glass | 364/900 |
| 4,381,542 | 4/1983 | Binder et al. | 395/725 |
| 4,463,445 | 7/1984 | Grims | 364/900 |
| 4,482,949 | 11/1984 | Cates | 364/200 |
| 4,482,954 | 11/1984 | Vrielink et al. | 395/725 |
| 4,495,569 | 1/1985 | Kagawa | 364/200 |
| 4,620,278 | 10/1986 | Ellsworth et al. | 364/200 |
| 4,631,669 | 12/1986 | Horikawa | 364/200 |
| 4,648,029 | 3/1987 | Cooper et al. | 364/200 |
| 4,716,523 | 12/1987 | Burrus, Jr. et al. | 364/200 |
| 4,794,516 | 12/1988 | Auerbach et al. | 364/200 |
| 5,034,881 | 7/1991 | Hoashi et al. | 364/200 |
| 5,067,071 | 11/1991 | Schanin et al. | 395/225 |
| 5,109,513 | 4/1992 | Otsuka | 395/725 |

OTHER PUBLICATIONS

Motorola's user's manual, M68000 8-/16-/32-bit up, Sixth Edition published by Prentice Hall, 1989.

*Primary Examiner*—Thomas C. Lee
*Assistant Examiner*—Krisna Lim
*Attorney, Agent, or Firm*—Jonathan P. Meyer; Susan C. Hill

[57] ABSTRACT

In a microcomputer including a CPU and a plurality of modules operatively connected through a main bus including address and data lines, a method of interrupting an operation including providing an interrupt request line and an arbitration bus, and arbitrating between modules and with the CPU on the arbitration bus so that no use of the main bus for arbitration or an interrupt acknowledge are required and the CPU can continue the operation as the arbitration proceeds.

19 Claims, 2 Drawing Sheets

SYSTEM WITH MODULES USING PRIORITY NUMBERS RELATED TO INTERRUPT VECTORS FOR BIT-SERIAL-ARBITRATION ON INDEPENDENT ARBITRATION BUS WHILE CPU EXECUTING INSTRUCTIONS

This application is a continuation of prior application Ser. No. 07/459,507, filed Jan. 2, 1990, now abandoned.

FIELD OF THE INVENTION

The present invention pertains to an improved method of interrupting operations in a microcomputer and more specifically to a method of arbitrating between modules requesting an interrupt in a microcomputer without requiring CPU operating time and time on the main bus.

BACKGROUND OF THE INVENTION

In general, microcomputers include a microprocessor or central processing unit (CPU) and a plurality of modules, which may be on a single chip or on a plurality of chips, connected together by means of a main bus, which includes address and data lines. The main bus is time shared by all of the modules. Whenever a module requires a fast response, it sends a signal known as an interrupt to the CPU. An interrupt causes the CPU to stop execution of its main program or operation and jump to a special program that responds to the needs of the interrupting module. Essentially, control of the main bus is said to be shifted to the interrupting module. Interrupts have a variety of priorities, depending upon their importance to the system and the urgency of the requested action.

Typically, an interrupt is initiated by a module applying an interrupt request signal to an interrupt request line, which is connected to the CPU. Once an interrupt request is sensed, the CPU starts an interrupt acknowledge sequence utilizing the main bus. The acknowledge sequence includes polling the modules to determine which module or modules requested the interrupt and what priority the requesting module or modules have. If the priority of at least one of the interrupting modules is higher than the priority of the operation currently being performed by the CPU, the CPU sends an interrupt acknowledge signal to the interrupting module and stacks, or stores, the operating information from the current operation. The major problem is that the CPU and the main bus are tied up during the interrupt acknowledge sequence and valuable operating time is used.

SUMMARY OF THE INVENTION

It is an object of the present invention to provide a new and improved method of interrupting a CPU in a microprocessor.

It is a further object of the present invention to provide a more efficient interrupt sequence in a microprocessor.

It is a further object of the present invention to provide a new and improved method of interrupting a microprocessor without using the main bus and additional CPU time for an interrupt acknowledge sequence.

It is a further object of the present invention to provide an improved microcomputer wherein interconnections are reduced, which simplifies the addition of modules to the system.

These and other objects are realized in a method of interrupting a microprocessor including a CPU and a plurality of modules operatively connected thereto by a main bus including data and address lines, said method including providing an arbitration bus having at least one line connected to the CPU and each of the plurality of modules, supplying from the CPU on the arbitration bus interrupt priority level signals indicative of the priority level of the current operation in progress, supplying from the requesting module to the arbitration bus interrupt priority level signals indicative of the priority level of the requesting module, and controlling the main bus from the one of the CPU and requesting modules that has the highest priority level. Since the CPU arbitrates directly with the requesting modules on the arbitration bus, no interrupt acknowledgement or interrupt acknowledge sequence are required.

DESCRIPTION OF THE PREFERRED EMBODIMENTS

Figure 1:
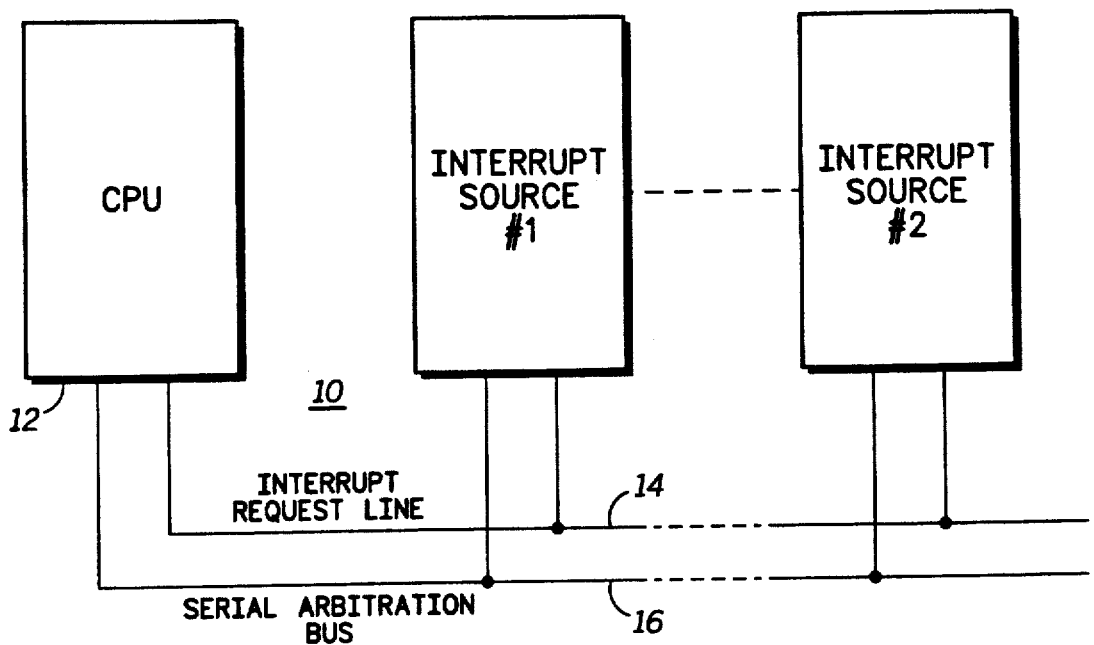
FIG. 1 is a generalized block diagram of a microprocessor embodying the present invention.

Referring specifically to FIG. 1, a generalized block diagram of a microprocessor 10 is illustrated which embodies the present invention. Microprocessor 10 includes a CPU 12 and a plurality of modules #1 through #n. Each of the plurality of modules is coupled to CPU 12 through a main bus (not shown) which includes the usual data and address lines, and is capable of interrupting CPU 12 during normal operations. As is well known in the art, during an interrupt the interrupting module is said to have taken over control of the main bus and addresses and data are communicated between the interrupting module and CPU 12.

In microprocessor 10, CPU 12 and the plurality of modules are also connected by an interrupt request line 14 and a serial arbitration bus 16, which includes at least one line. Requests for an interrupt are communicated to CPU 12 over interrupt request line 14 and all arbitration for the interrupt is accomplished using the present novel method on serial arbitration bus 16 so that no use of the main bus is required and the interrupt acknowledge sequence is eliminated.

Figure 2:
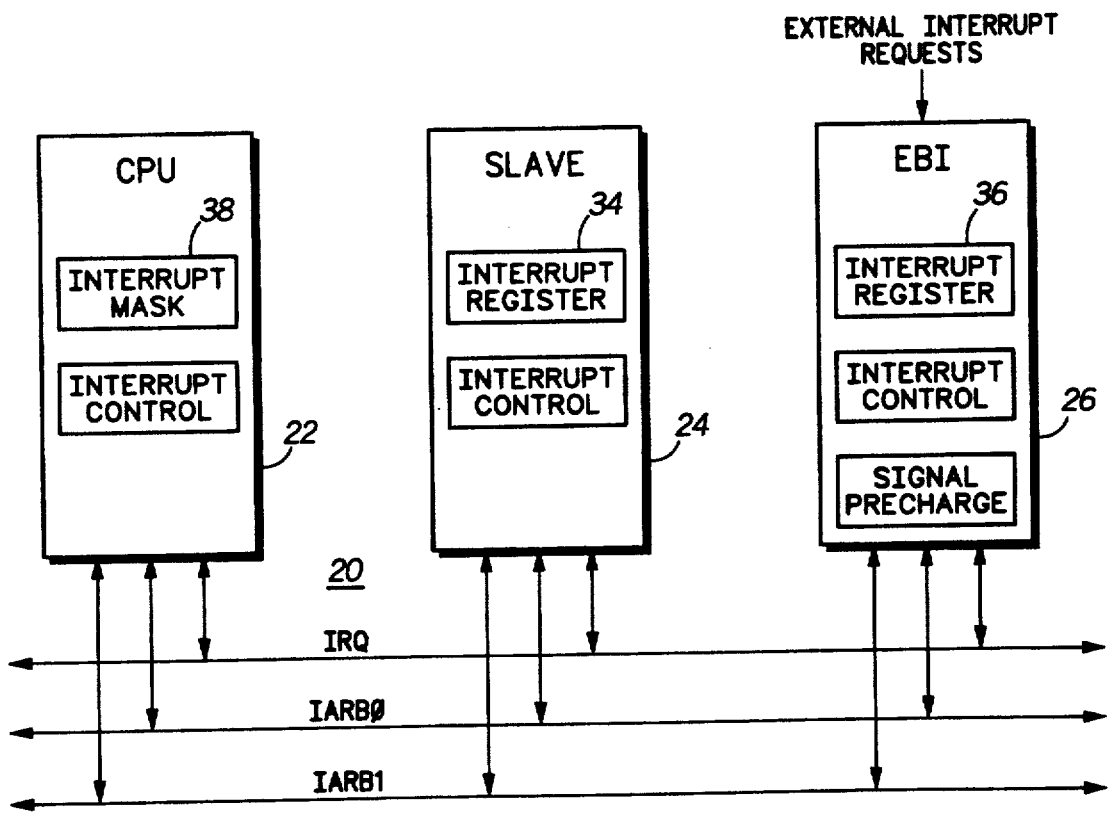
FIG. 2 is a block diagram, similar to FIG. 1, of a specific embodiment of a microprocessor embodying the present invention.

Referring to FIG. 2, a specific embodiment, designated 20, of microprocessor 10 is illustrated. Microprocessor 20 includes a CPU 22, a slave module 24 and an external bus interface (EBI) 26, which is utilized to couple various external modules to CPU 22 through a main bus (not shown). CPU 22, slave module 24 and EBI 26 are also coupled through an interrupt request line IRQ and a pair of interrupt arbitration lines (serial arbitration bus) IARB0 and IARB1. Two lines are used in the serial arbitration bus in the present embodiment to allow for precharging of lines IARB0 and IARB1, as will be explained presently.

Figure 3:
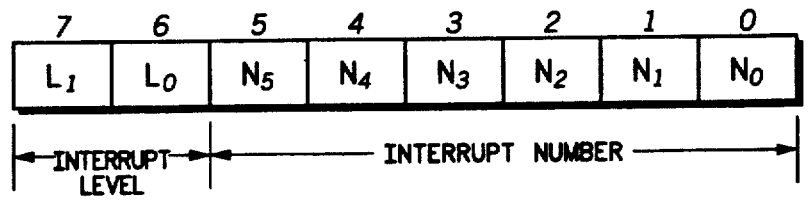
FIG. 3 is a diagram of an interrupt register from the microprocessor of FIG. 2.

Slave module 24 and EBI 26 each include an eight bit interrupt register, designated 34 and 36 respectively, the contents of which are split into two fields as illustrated in FIG. 3. The least significant six bits of interrupt registers 34 and 36 contain an interrupt number for the associated module, or interrupt request source. The interrupt number signifies the source's interrupt priority relative to all other interrupt request sources. The higher the value, the higher the priority. The interrupt number is only used if two or more interrupt requests simultaneously occur. In this embodiment the interrupt number is user programmable, but it may, optionally, be automatically configured according to, for example, the number of the channel that is initiating the interrupt request. The most significant two bits of interrupt registers 34 and 36 are used as an extension to the priority scheme and may be fixed or programmable, depending on the flexibility required. The two most significant bits provide four further levels of interrupt priority. The eight bit number in the interrupt register (both fields) will be referred to herein as the arbitration number. The eight bits of interrupt registers 34 and 36 are also used to determine the CPU vector that will be taken, assuming that the interrupt request is recognized by CPU 22. A total of 256 CPU interrupt vectors are possible, corresponding to each conceivable value of the interrupt register. Interrupt vectors are well understood by those skilled in the art and will not be elaborated upon herein.

CPU 22 includes an interrupt mask register 38, which is basically the same as interrupt registers 34 and 36. Interrupt mask register 38 always contains the interrupt level of the current operation of CPU 22 in the two most significant bits. The least significant six bits are always zeroed. Interrupt mask register 38 is used by CPU 22 in the arbitration scheme as described below. As is apparent, the specific numbers of bits and their locations in one or more registers such as interrupt registers 34 and 36 and interrupt mask register 38 may be varied widely in order to suit the requirements of a particular implementation of the present invention.

Figure 4:
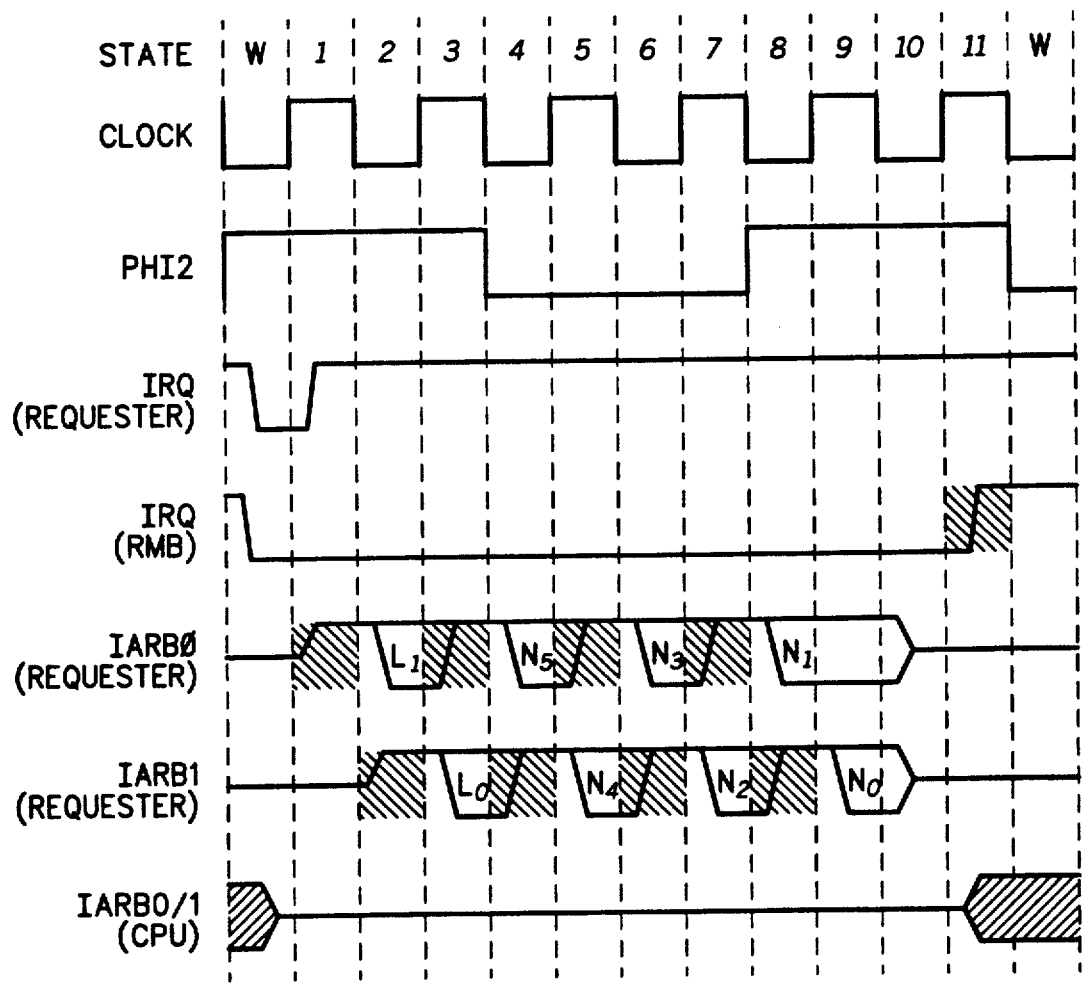
FIG. 4 is a timing diagram illustrating an interrupt request cycle in the microprocessor of FIG. 2.

A module, or interrupting source, applies an interrupt signal to interrupt request line IRQ, thereby signaling that an interrupt is being requested. Each module or source must first check that no other source is currently making a request, before making a request, to insure that any arbitration cycles that are already underway will not be interfered with. If two or more sources simultaneously request an interrupt, arbitration occurs between the two or more sources and CPU 22, otherwise the arbitration only occurs between the single interrupting source and CPU 22. FIG. 4 illustrates a typical timing diagram for an interrupt cycle.

An interrupt cycle begins with an interrupt request by one or more modules, or sources. An interrupt request is signalled by asserting interrupt request line IRQ on any falling edge of the CLOCK signal (referring to FIG. 4). Interrupt request line IRQ is a logically wired-OR line which allows several modules to request an interrupt at the same time. Before interrupt request line IRQ can be asserted, the requesting modules must check to see if an interrupt arbitration cycle is already in progress, which is signified by interrupt request line IRQ already being asserted. Interrupt request line IRQ is sampled on every rising edge of the CLOCK signal, just prior to it being precharged, to perform this check. If an interrupt arbitration cycle is in progress then the requesting modules must hold off until interrupt request line IRQ is no longer asserted, at which time they may go ahead and each assert interrupt request line IRQ, after which it must remain asserted until the interrupt arbitration cycle is completed.

Upon detecting an interrupt request, CPU 22 and all requesting modules will immediately begin an interrupt arbitration cycle, however, CPU 22 will not begin its stacking operations, if any, until the current instruction has been completely executed. In this embodiment, arbitration is carried out using a two line, bit serial arbitration scheme and a programmable eight bit number (arbitration number) for each module capable of generating an interrupt. During interrupt arbitration, the arbitration number is driven in bit serial form, alternating between lines IARB0 and IARB1, which allows for precharging. Because of the nature of lines IARB0 and IARB1, a "one" bit in the arbitration number will generate a corresponding "low" level during interrupt arbitration with the most significant bit of the arbitration number being generated first. Because of the logically wired-OR bus, a low level effectively wins any contention. If contention is detected, i.e. driving high and detecting a low, the module that lost the arbitration must immediately stop driving its arbitration number on interrupt arbitration lines IARB0 and IARB1. At the end of the interrupt arbitration cycle, one interrupt source will remain and it is said to have 'won arbitration'. CPU 22 will use the arbitration number of this winning module to determine where to vector. After the last bit has been sent, the interrupt request on interrupt request line IRQ is negated allowing further interrupt cycles to occur.

CPU 22 effectively only attempts to 'win arbitration' over the interrupt priority level field (most significant two bits), since the interrupt number field (least significant six bits) is always zeroed. If CPU 22 does win then this means the requesting interrupt source was not of a sufficiently high priority level and so the requesting interrupt source will need to try again once the current interrupt request cycle has finished. The interrupt request is said to have been 'masked'. If CPU 22 loses arbitration then the requesting interrupt is of a sufficiently high priority level and so CPU 22 may immediately begin any stacking operations required in order to save its current state. The interrupt request has then not been masked. Typically, CPU 22 will also increment the value of the interrupt priority level field so as to mask further interrupts occurring at the same level.

Referring specifically to FIG. 4, the following describes the activity that occurs during each interrupt cycle state. In FIG. 4, stippled areas indicate precharge and crosshatched areas indicate a current interrupt mask level.

STATE(IW)—This is the idling or 'interrupt wait' state. This state is maintained as long as no interrupt cycle is taking place. CPU 22 drives interrupt arbitration lines IARB0 and IARB1 with a representation of its current interrupt mask level. If a module, that wishes to request an interrupt, observes that the current mask level is below that of the request then it may assert interrupt request line IRQ on the next rising edge of the CLOCK signal, so long as it is not already asserted. CPU 22 uses the interrupt request signal as a gating signal for the driving of interrupt arbitration lines IARB0 and IARB1, such that the assertion of interrupt request line IRQ will cause lines IARB0 and IARB1 to be three-stated and the negation of interrupt request line IRQ will cause lines IARB0 and IARB1 to be driven by CPU 22. The assertion of interrupt request line IRQ is also an indication to EBI 26 that it must begin its precharging duties for the interrupt cycle. This state is also entered following a reset or if any difference is detected between the driven bit value and the resultant bit value on lines IARB0 and IARB1 during STATE(I2) through STATE(I9).

STATE(I1)—The requesting module (or modules) may negate the interrupt request, but it will remain asserted on line IRQ (RMB) due to holding devices within EBI 26. At this time EBI 26 precharges interrupt arbitration line IARB0.

STATE(I2)—The requesting module drives bit L1, of its interrupt register, onto interrupt arbitration line IARB0. EBI 26 precharges line IARB1.

STATE(I3)—The requesting module drives bit L0, of its interrupt register, onto line IARB1. EBI 26 precharges line IARB0.

STATE(I4)—The requesting module drives bit N5, of its interrupt register, onto line IARB0. EBI 26 precharges line IARB1.

STATE(I5)—The requesting module drives bit N4, of its interrupt register, onto line IARB1. EBI 26 precharges line IARB0.

STATE(I6)—The requesting module drives bit N3, of its interrupt register, onto line IARB0. EBI 26 precharges line IARB1.

STATE(I7)—The requesting module drives bit N2, of its interrupt register, onto line IARB1. EBI 26 precharges line IARB0.

STATE(I8)—The requesting module drives bit N1, of its interrupt register, onto line IARB0. EBI 26 precharges line IARB1.

STATE(I9)—The requesting module drives bit N0, of its interrupt register, onto line IARB1. Holding devices in EBI 26 maintain the previous level of line IARB0.

STATE(I10)—Holding devices in EBI 26 maintain the previous level of IARB0. The requesting module must no longer be driving either lines IARB0 or IARB1.

STATE(I11)—EBI 26 precharges line IRQ. This causes line IRQ to be negated, which causes CPU 22 to begin driving lines IARB0 and IARB1 with its mask level again.

STATE(IW)—Is reentered in preparation for the next interrupt request.

Thus, the interrupt structure of the specific embodiment illustrated supports a total of 128 interrupt vectors and 4 interrupt levels. Each interrupt source is assigned an arbitration number, by the user, which is then used to determine the module's relative priority should two or more sources simultaneously request an interrupt. The higher the arbitration number, the higher the effective priority of the interrupt source. This arbitration number is subsequently used as an offset into a vector table in CPU 22 so that the interrupt service routine may be directly entered, eliminating the need to poll all sources to determine which one caused the interrupt. All external interrupt sources are grouped together as internal interrupt sources through EBI 26. EBI 26 may group, prioritize and then resolve external interrupts in any way that the operator chooses, as long as the maximum number of interrupt sources is not exceeded.

The present structure and method completely eliminates the "Interrupt Acknowledge Sequence" that usually signifies to an interrupt source whether it succeeded in interrupting the CPU or not. The interrupt source can tell if it was successful by observing whether it won arbitration over the interrupt priority level field. Also, separate interrupt arbitration and request lines are provided so that the entire interrupt arbitration cycle is resolved without using the main bus. It will of course be understood that the serial arbitration bus can be one or more lines, and two were illustrated in the preferred embodiment to allow for the precharging of the lines. In most MCU's interrupts are nested. Thus, to conserve power, when a module is serviced completely the CPU may drop the interrupt mask on the serial arbitration bus to the previous level of interrupt. In this fashion the modules do not continue to supply interrupt signals to the serial arbitration bus and power is saved. The arbitration number can be used to give a module a higher priority level and/or to indicate a specific function within the MCU. The present invention can be used at a chip or system level and only the serial arbitration bus and request line need to be connected to add modules, thus, reducing interconnections and simplifying the addition of modules to the system.

It should be noted that it is possible to eliminate the interrupt request line altogether by monitoring the serial arbitration line for activity and utilizing the detection of activity as an interrupt request. The disadvantage of this system, though, is that it increases the latency of the system as the requesting source must wait a sufficient amount of time in order to ensure that the serial arbitration line is truly idle (some bit streams of data may resemble an idle line).

While I have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

I claim:

1. In a microcomputer comprising a processor which executes instructions and responds to interrupt requests and a plurality of modules which are capable of producing interrupt requests, a method of interrupt arbitration and interrupt vector determination comprising the steps of:

providing an interrupt request line coupled to each of the plurality of modules;

while the processor continues instruction execution, performing the steps of:
  (i) providing an arbitration bus including at least one line, coupled to each of the plurality of modules, the arbitration bus transferring only information related to interrupts;
  (ii) supplying from at least two of said plurality of modules on the arbitration bus, in bit serial fashion, multi-bit interrupt priority number signals indicative of an interrupt priority number of each of the at least two of said plurality of modules; and
  (iii) without polling said plurality of modules, determining, based upon the multi-bit interrupt priority number signals, which one of the at least two of said plurality of modules has a higher interrupt priority number;

interrupting the processor;

transferring the higher priority interrupt number to the processor;

using the higher priority interrupt number as an offset into a vector table in order to determine an interrupt vector; and using the interrupt vector to enter an interrupt vector service routine.

2. A method according to claim 1 further comprising the steps of:
   determining whether any multi-bit interrupt priority number signals are currently being supplied on the arbitration bus; and
   if multi-bit interrupt priority number signals are currently being supplied on the arbitration bus, then waiting until all such activity is completed.

3. A method according to claim 1 wherein the arbitration bus further comprises a pair of lines and the method further comprises the steps of:
   supplying one bit of each of said multi-bit interrupt priority number signals on one of said pair of lines;
   supplying a succeeding bit of each of said plurality of multi-bit interrupt priority level signals on the other of said pair of lines;
   repeating the steps of supplying one bit and supplying a succeeding bit until all of said bits of said multi-bit interrupt priority level signals have been supplied;
   precharging, during each step of supplying one bit of each of said multi-bit interrupt priority level signals on one of said pair of lines, the other of said pair of lines; and
   precharging, during each step of supplying a succeeding bit of each of said plurality of multi-bit interrupt priority level signals on the other of said pair of lines, the one of said pair of lines.

4. A method according to claim 1 wherein the processor is coupled to the arbitration bus and the method further comprises the steps of:
   supplying from the processor on the arbitration bus, in bit serial fashion, multi-bit interrupt priority level signals indicative of an interrupt priority level of a current operation in progress in the processor;
   supplying from at least two of said plurality of modules on the arbitration bus, in bit serial fashion, multi-bit interrupt priority level signals indicative of an interrupt priority level of each of the at least two of said plurality of modules;
   determining whether the current operation in progress in the processor or the at least one of the plurality of modules has a higher interrupt priority level and, if the at least one of the plurality of modules has a higher priority level, determining which one of the at least one of the plurality of modules has the highest priority level; and
   using the highest interrupt priority level to determine the interrupt vector.

5. In a microcomputer, including a CPU and a plurality of modules operatively coupled through a main bus for transferring non-interrupt information, a method of arbitrating for interrupt priority and of determining an interrupt vector, comprising the steps of:
   while the CPU continues instruction execution, performing the steps of:
     (i) supplying, from a first module to the arbitration bus, interrupt priority number signals indicative of the interrupt priority number of the first module, while simultaneously supplying, from a second module to the arbitration bus, interrupt priority number signals indicative of the interrupt priority number of the second module, each of the interrupt priority number signals from the first module and from the second module including a series of binary bits applied serially to the arbitration bus; and
     (ii) without polling said plurality of modules, arbitrating between the first module and the second module during each bit of the interrupt priority number signals in order to determine a highest interrupt priority number, the highest interrupt priority number being based upon the interrupt priority number signals;
   interrupting the current operation in progress in the CPU;
   transferring the highest priority interrupt number from the arbitration bus to the CPU;
   using the highest priority interrupt number as an offset into a vector table in order to determine the interrupt vector; and
   using the interrupt vector to enter an interrupt vector service routine.

6. A method as claimed in claim 5 wherein the method further comprises the steps of:
   providing an interrupt request line which is separate from the main bus and which is connected to each of the plurality of modules;
   checking, from a first module and from a second module, for interrupt requests from any of the plurality of modules on the interrupt request line;
   waiting, with the first module and with the second module, until all other interrupt requests have completed arbitration; and
   asserting, from the first module and from the second module, the interrupt request line.

7. A method as claimed in claim 5 further comprising the steps of:
   determining during each bit of the interrupt priority number signals whether the first module is to continue arbitrating during the subsequent bits of the interrupt priority number signals; and
   determining during each bit of the interrupt priority number signals whether the second module is to continue arbitrating during the subsequent bits of the interrupt priority number signals.

8. A method as claimed in claim 5 wherein the arbitration bus includes a pair of lines and the step of supplying to the arbitration bus further comprises the step of:
   serially applying the series of binary bits to alternate ones of the pair of lines, with the equivalent bit in the series of binary bits from each of the first module and second module being supplied simultaneously to one of the pair of lines.

9. A method as claimed in claim 5 further comprising the step of:
   precharging the arbitration bus.

10. A method as claimed in claim 5 wherein the first module and the second module are located on a same semiconductor chip, and the first module is capable of receiving an interrupt request from a third module that is not located on the same semiconductor chip.

11. A method as claimed in claim 6 wherein the CPU is coupled to the interrupt request line and wherein the method further comprises the steps of:
   holding the arbitration bus at an interrupt priority level of the current operation in progress in the CPU;
   supplying, from the first module to the arbitration bus, interrupt priority level signals indicative of an interrupt priority level of the first module, while simultaneously supplying, from the second module to the arbitration bus, interrupt priority level signals indicative of an interrupt priority level of the second module, each of the interrupt priority level signals from the first module and from the second module including a series of binary bits applied serially to the arbitration bus;

arbitrating, between the CPU and the first and second modules during each bit of the interrupt priority level signals; and interrupting the current operation in progress in the CPU if at least one of the interrupt priority level of the first module and the interrupt priority level of the second module is higher priority than the interrupt priority level of the current operation in progress in the CPU.

12. A method as claimed in claim 6 further comprising the step of: precharging the interrupt request line.

13. A method as claimed in claim 11 wherein the step of supplying interrupt priority level signals is performed before the step of supplying interrupt priority number signals.

14. A method as claimed in claim 11 further comprising the step of:

stopping arbitration in any of the CPU and first and second modules during any bit of the interrupt priority number signals and interrupt priority level signals for that CPU and first and second module that loses the arbitration.

15. A method as claimed in claim 11 further comprising the step of:

using eight binary bits total to represent both the interrupt priority number and the interrupt priority level.

16. A method as claimed in claim 11 further comprising the step of:

setting each of the interrupt priority level signals to include a two bit binary signal and each of the interrupt priority number signals to include a six bit binary signal.

17. A method as claimed in claim 11 further comprising the step of:

setting the interrupt priority number of the CPU to a binary zero.

18. In a microcomputer comprising a processor which executes instructions and responds to interrupt requests, a plurality of arbitrators which are capable of producing interrupt requests, a main bus comprising address and data lines coupling the processor and the arbitrators together, and an arbitration bus comprising at least one line which is not a part of the main bus, a method of arbitrating interrupt priority and of determining an interrupt vector comprising the steps of:

storing a multi-bit interrupt priority number value;

while the processor continues instruction execution, each of the plurality of arbitrators which has produced an interrupt request synchronously performing the steps of:

(i) supplying a single bit of the interrupt priority number value to the arbitration bus;

(ii) detecting whether another arbitrator has supplied a single bit of higher interrupt priority to the arbitration bus;

(iii) conditionally ceasing, if such higher interrupt priority bit has been supplied, to supply bits of the interrupt priority number value;

(iv) repeating, if such higher interrupt priority bit has not been supplied. the steps of supplying, detecting and conditionally ceasing until all of the bits of the multi-bit-interrupt-priority number have been supplied; and (v) retrieving one bit of a resolved priority value from the arbitration bus for each bit of the multi-bit interrupt priority number;

interrupting the processor;

using the resolved priority value as an offset into a vector table in order to determine an interrupt vector; and using the interrupt vector to enter an interrupt vector service routine.

19. A method according to claim 18 further comprising the steps of:

determining whether any multi-bit interrupt priority level signals are currently being supplied on the arbitration bus; and if multi-bit interrupt priority level signals are currently being supplied on the arbitration bus, then waiting until all such activity is completed.

* * * * *